May 8, 1923.
A. J. PERRON
1,454,184
SIGNAL APPARATUS FOR MOTOR VEHICLES
Filed April 27, 1922
3 Sheets-Sheet 1
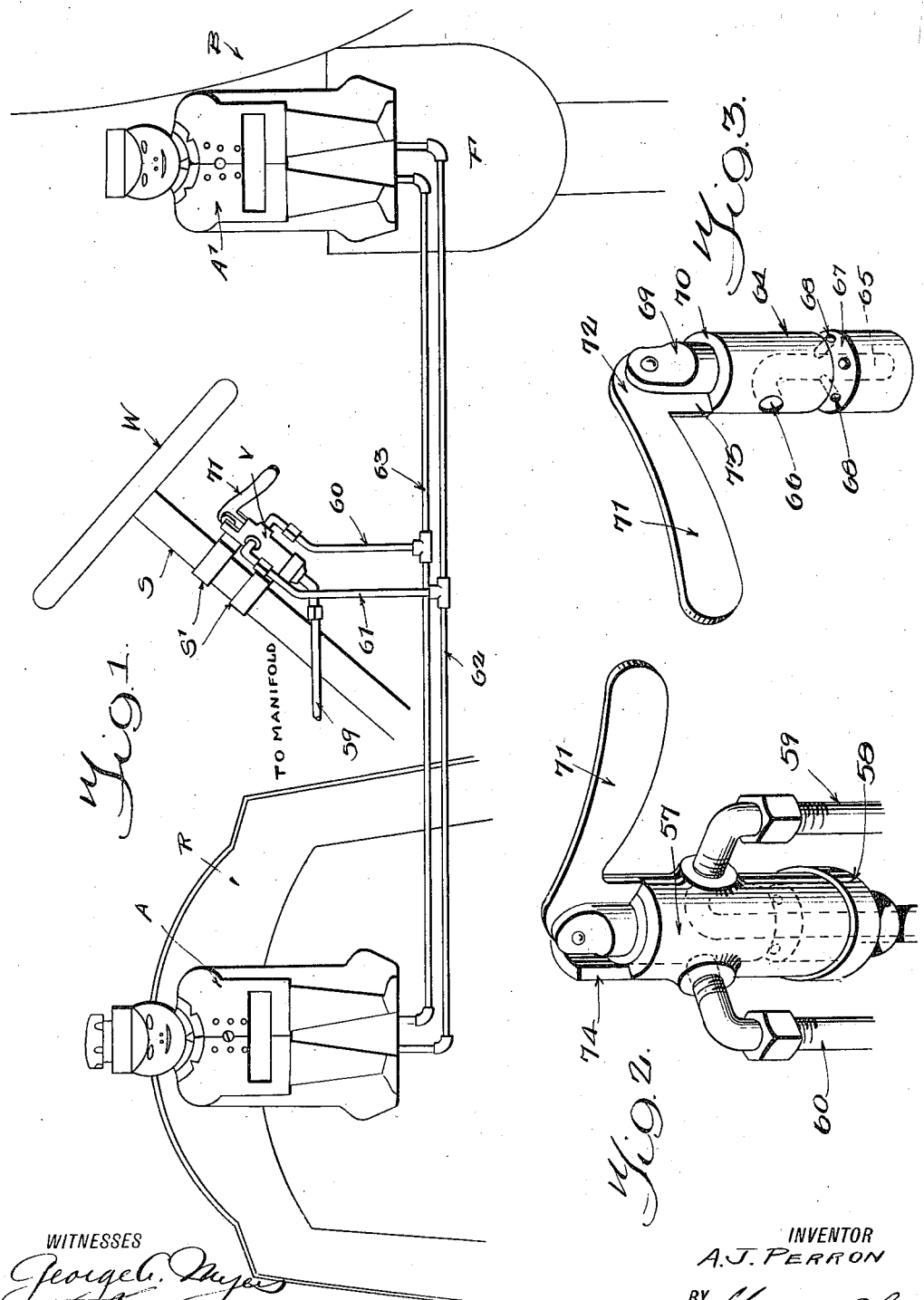
WITNESSES
INVENTOR
A. J. PERRON
BY
ATTORNEYS

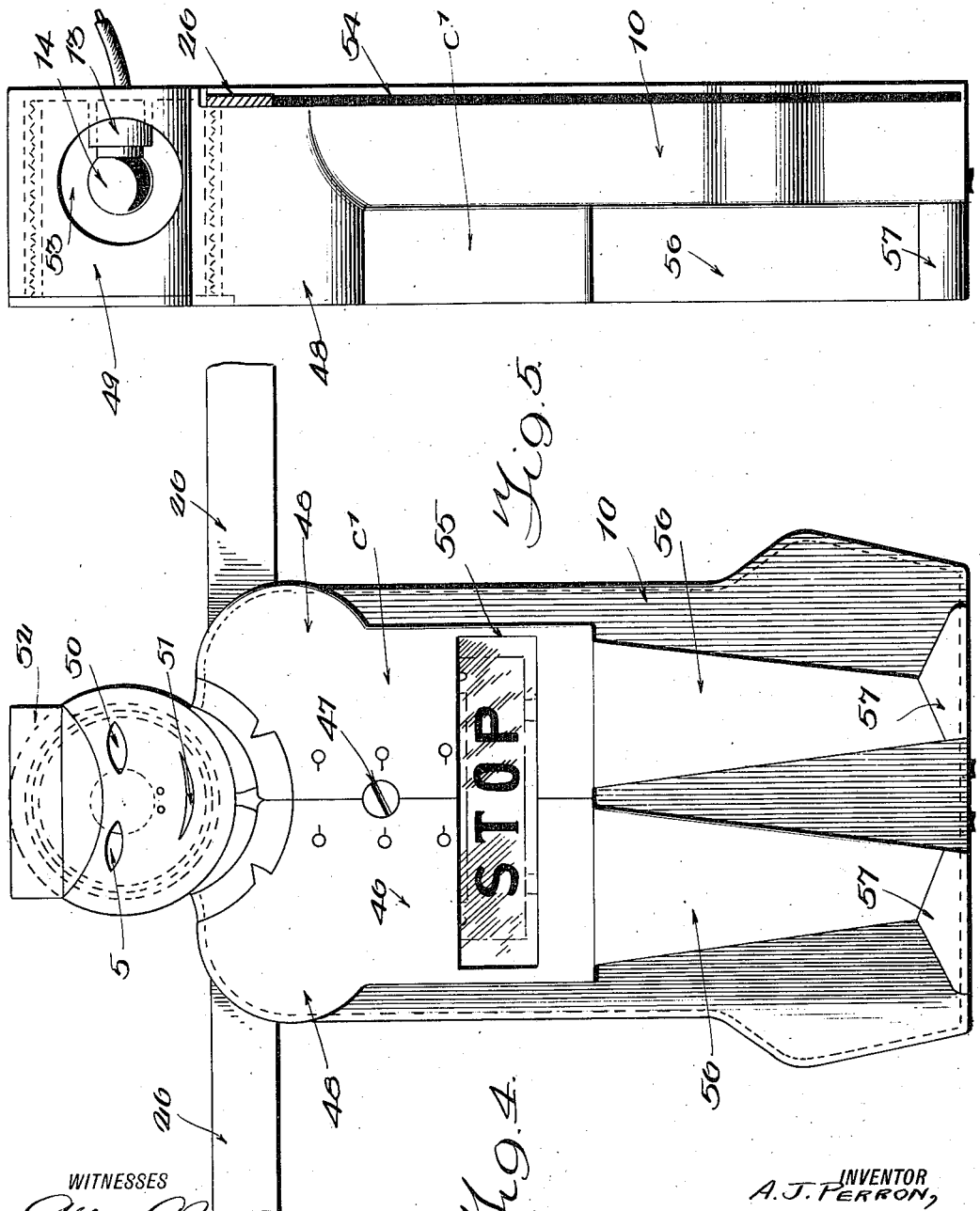

May 8, 1923.
A. J. PERRON
1,454,184
SIGNAL APPARATUS FOR MOTOR VEHICLES
Filed April 27, 1922    3 Sheets-Sheet 3
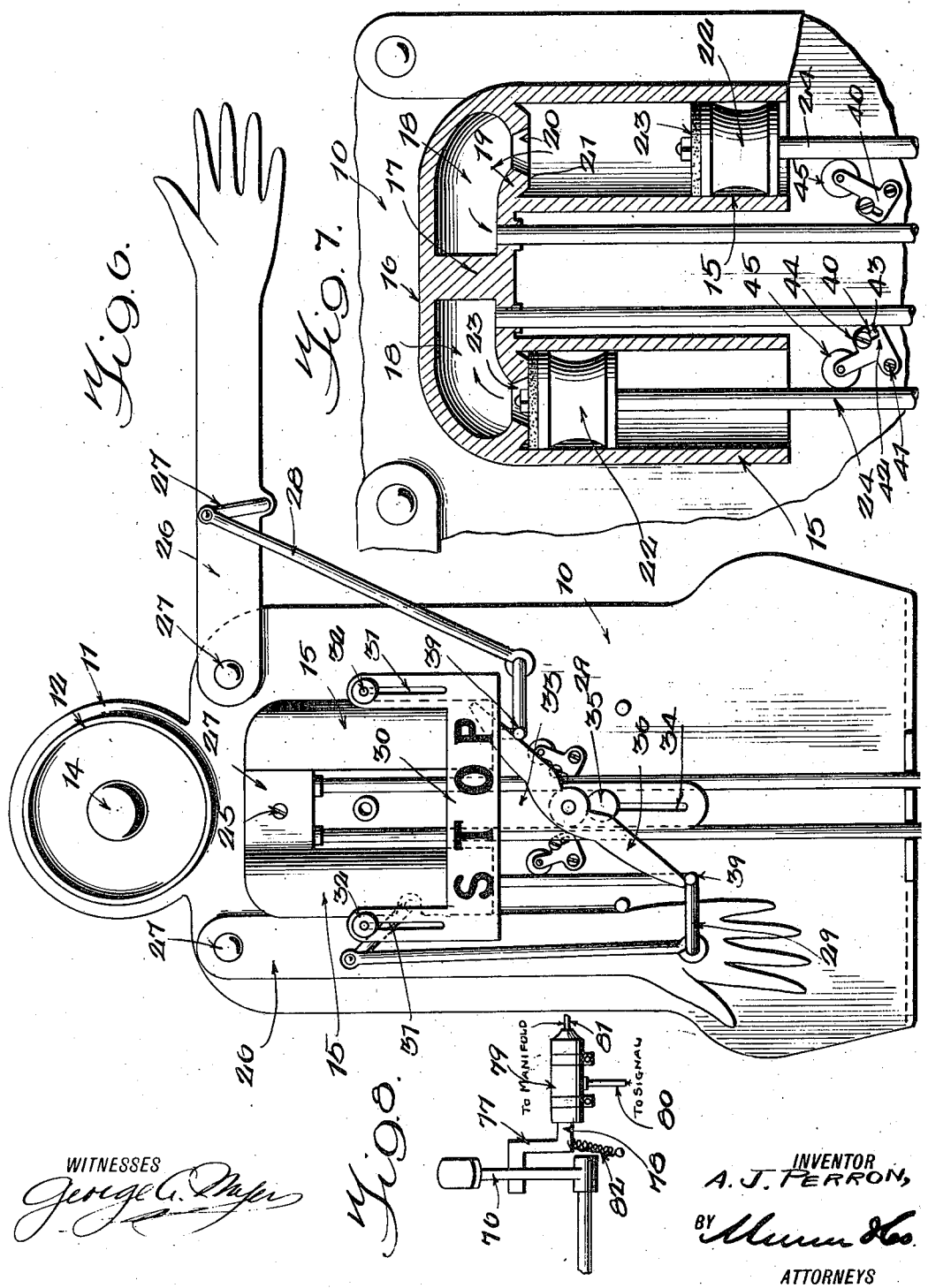

Patented May 8, 1923.

1,454,184

UNITED STATES PATENT OFFICE.

ALEXANDER J. PERRON, OF SPARTA, WISCONSIN.

SIGNAL APPARATUS FOR MOTOR VEHICLES.

Application filed April 27, 1922. Serial No. 556,945.

*To all whom it may concern:*

Be it known that I, ALEXANDER J. PERRON, a citizen of the United States, and a resident of Sparta, in the county of Monroe and State of Wisconsin, have invented certain new and useful Improvements in Signal Apparatus for Motor Vehicles, of which the following is a specification.

This invention relates to signal apparatus for motor vehicles or the like.

The object of the invention is to provide a signal apparatus of the above character which will give a highly conspicuous signal both at the rear and the forward end of a motor vehicle whereby to notify persons at the rear of the automobile and also forward thereto of the intention of the driver with relation to the movement of the motor vehicle and also the driver's intention of stopping the motor vehicle.

It is also an object of the invention that the signal carried at the rear of the motor vehicle be adapted to be utilized as a tail light.

A further object of the invention is that the apparatus be simple in construction and positive in operation.

Other objects and advantages relating to details of construction, combination and arrangement of parts will hereinafter appear in the detailed description to follow.

In carrying out the invention it is contemplated to preferably use two distinct signal units one at the forward end of a motor vehicle and one at the rear end thereof and to operate these signal units simultaneously from the steering wheel of the motor vehicle.

The invention is illustrated by way of example in the accompanying drawings, in which, Figure is a schematic view showing the invention applied to a motor vehicle.

Figure 2 is a view in side elevation of the valve used for operating the signals.

Figure 3 is a detailed view of the valve member proper.

Figure 4 is a front elevation of a signal unit.

Figure 5 is a view in side elevation of the same.

Figure 6 is a front elevation of the signal unit taken after the figure cover has been removed.

Figure 7 is a detail sectional view of the signal operating pistons and cylinders therefor.

Figure 8 is a detail view illustrating a valve arrangement for operating the signals simultaneously with the brake pedal for indicating "Stop."

Referring to the drawings more particularly in Figure 1 S indicates the steering column, W the steering wheel, R the radiator upon which there is mounted the signal unit A. At F is indicated the rear fender upon the left hand side of the car, at W' the rear wheel, at B the body of the car and at A' a second signal unit mounted upon the fender F. Upon the steering post S there is secured by suitable sleeves S' the valve V which is connected for operating the signals A and A' individually or simultaneously through suction from the manifold of the associated engine of the motor vehicle.

Both units A and A', shown, are of substantially the same structure and therefore only one will be described specifically. Referring to the Figures 4 to 7 inclusive, the signal unit employed in each instance consists in a supporting plate 10 which is slightly enlarged at its lower end as shown and its upper end formed with a circular protrusion 11 which is in turn formed upon its forward face with a ring 12. Also the circular portion 11 carries a socket 13 by which an electric lamp 14 is carried.

Upon the forward face of the supporting plate 10, there is mounted a pair of cylinders 15, said cylinders being connected by a neck 16 which is provided with a division wall 19 which is formed with a port 20 and also formed with beads or raised portions 21 extending about the port 20 and upon the lower side of the wall as shown. In each cylinder 15 is disposed a piston 22, each piston carrying on its upper end a packing plate 23 which is adapted to engage with the bead or raise 21 upon the piston assuming its extreme upper position and form a tight closure for the associated port 20. To each piston there is secured or connected one end of a connecting rod 24. The cylinders 15 may be secured to the base plate 10 in any preferable manner such as by a screw bolt as indicated at 25.

Adjacent the upper end of the supporting plate 10 there is pivoted the two arms 26, each arm being pivotally connected to the plate 10 at its inner end by a rivet or the like as at 27. To each arm 26 there is connected a link 27, said link being pivotally connected to the arm adjacent its lower end as shown and having its other end pivotally connected to a longer link 28. The other end of the link 28 in turn is pivotally connected to an arm 29, said arm extending outwardly from a connecting rod 24 of one of the pistons 22. This arrangement is the same for each arm 26.

Upon the forward side of the cylinders 15 there is positioned a U-shaped plate member 30 having the word "Stop" written upon its bridge portion and having each of its legs provided with a longitudinally extending slot 31. A post 32 extends through each slot 31 and each post having threaded thereon a nut as shown to hold the plate 30 in position and also to permit vertical sliding movement of said plate. The lower edge of the bridge portion is formed with an extension 33 which is longitudinally slotted as at 34 adjacent its lower end and through this slot there extends a post 35. Suitable nuts are arranged on the posts 32 and 35 in order to hold the plate 30 in spaced relation with the outer side of the cylinder 15. Upon the extension 33 of the plate 30 there is pivoted a cross arm 36, the ends of said cross arm being adapted to engage the extensions 39 from the connected rods 24. Upon one piston 22 moving upwardly as illustrated in Figure 6, the cross arm 36 will swing upon its pivot but upon both the pistons moving upwardly the cross arm will draw therewith the stop member of plate 30. It is thought this operation is clearly obvious.

For each connecting rod 24 there is provided a substantially L-shaped bracket plate 40 which is pivotally secured to the supporting plate 10 by a screw 41 and which is formed with an enlargement 42 provided with a slot 43. A screw 44 is extended to the slot and threaded into the supporting plate 10 whereby the position of the roller 45 carried by the member 40 may be changed. The roller 45 in each instance engages the associated connecting rod 24 and is adapted to overcome the side thrust thereof when said connecting rod is drawn by its piston for lifting the associated signal arm 26.

For the mechanism heretofore described mounted upon the supporting plate 10 there is provided a cover C which is in the form of a figure representing a policeman. The casing or cover is generally indicated by the reference character C' and consists in the body portion 46 which has a screw bolt 47 extending therethrough and securing the casing or cover to the supporting plate 10. The cover is also formed with the enlargements 48 to represent the shoulders of the figure and likewise the cylindrical portion 49, the forward end of which is formed with the openings 50 to represent the eyes of the figure and the opening 51 to represent the mouth. Also a cap 52 is formed upon the cylindrical portion 49. The forward end of the cylindrical portion 49 should have fitted therein a plate of glass colored red if the unit is intended to be used at the rear end of a motor vehicle and if the unit is to be used at the forward end of the vehicle the glass should be preferably frosted. Also the cylindrical portion 49 is provided with a pair of diametrically opposed openings 53, each of which may have fit therein a lens and each of which is in alinement with the light 14 carried upon the supporting plate 10. The rear end of the cylindrical portion 49 of the cover C' is adapted to fit about the ring 12 formed upon the supporting plate 10 and the cover may otherwise be secured to the supporting plate 10 in any preferred manner. Also the cover C' has its rear edges offset to provide a slot 54 for each of the signal arms 26.

The body portion 46 of the cover figure C' is formed with a transverse opening 55 with which the bridge portion of the plate 30 may be brought into register and to display the word "Stop." The figure cover C' is completed by the leg portions 56 and the feet 57.

The valve V consists in a cylindrical casing 57 which carries a cap 58 at its lower end to facilitate the connection of the interior of said casing with a pipe 59 and said pipe 59 being connected to the intake manifold of the associated internal combustion engine of the motor vehicle. The casing 57 is also connected with the two pipes 60 and 61. The pipe 61 in turn communicates through the pipe 62 with the right hand cylinder 15 of each of the units A and A' and the pipe 60 communicates through the pipe 63 with the left hand cylinder 15 of each unit A and A'. The pipes 62 and 63 preferably communicate with the chambers 18 of the signal units as illustrated in Figure 7 of the drawings.

Within the valve casing 57 there is fitted a valve member 64 which has a bore 65 communicating with a port 66 and which is also formed with a groove 67 and with a plurality of ports or orifices 68 which extend between the bottom of the groove 67 and the bore 65. The upper end of the valve member is provided with a bifurcated projection 69 which forms a shoulder 70. The bifurcated portion 69 has secured thereto an operating handle 71 which has its head portion 72 extending from the valve member 64 as at 73 and adapted to seat upon the upper end of the casing 57. The casing 57 is also formed with a projecting portion 74 which is adapted to limit the rotative movement of the valve member 64 in a manner believed apparent. This projection 74 carries a set screw 75 which is adapted to engage the shoulder 70 of the valve member 64 and limit the upward movement of the valve member.

The valve member 64 may be turned in its casing 57 to bring its port 66 to register with the pipe connection 60 or the same may be turned to bring the same port to register with the pipe connection 59. Further upon raising the valve member 64 until the same engages the set screw 75 then the groove 67 is brought into register with the pipe connections 59 and 60.

Referring to Figure 8, at 76 is indicated the usual brake pedal employed on motor vehicles and which has loosely connected therewith the outer end of the crank 77, said crank in turn being connected at its inner end with a piston 78 and the piston 78 being enclosed by a cylinder 79. The piston 78 is hollow and having an opening in its side adapted to be brought to register with the opening in the cylinder 79 which communicates with a pipe 80. The pipe 80 in turn may be connected to both the pipe 62 and 63 and the other end of the cylinder 79 is connected to a pipe 81 which in turn is connected to the intake manifold of the associated internal combustion engine. Also there is employed a coil spring 82 which is adapted to hold the crank member 77 in position for closing communication between its piston valve 78 and the pipe 80.

In the use of the present signalling device the front signal unit A is secured to the radiator cap in any desired manner and the rear signal unit A' may be secured upon the left rear fender F or it may be secured immediately at the rear of the motor vehicle. Suitable electrical connections may be employed so that the lamp 14 in each signal unit will be energized simultaneously with each portion of said signal units, that is whether the signal units are operated to indicate the left or right or whether they are operated to indicate that the vehicle will stop. Also suitable electrical connections should be made so that the lights 14 may be energized when the signal units are not operating and the signal units may then be used or employed as parking lights for the motor vehicle.

Assuming that the signal units are mounted as illustrated in Figure 1 and that the driver of the motor vehicle wishes to indicate to persons forward and at the rear of his motor vehicle that it is his intention to turn to the left, he would then swing the valve handle 71 to the left which would operate in an obvious manner to cause the pistons 22 on the left hand side of each unit to move upwardly and in turn to swing the left hand arm 26 upwardly. If it was in the night time that this signal was given the light 14 in each instance should become energized when the arm 26 reaches its signalling position and light would be projected through the associated opening 53 of the figure cover C' to illuminate the arm 26. This same operation will be repeated in case it is desired to turn to the right. Should the driver wish to stop he may raise the valve member 64 by lifting the same with the handle 71 whereupon suction from the intake manifold of the associated internal combustion engine may be utilized for operating both pistons 22 of each signalling unit and thereby to raise both arms of each unit. Upon both arms of the unit raising the plate 30 will likewise be raised and the same brought to a position so that its bridge portion bearing letters to form the word "Stop" will be in register with the opening 55 and thus indicating to the traffic the intention of the driver. If in the night time the light 14 in each unit would become energized and the plate bearing the word "Stop" would be illuminated. Likewise rays of light would be projected from the eyes 50 and mouth 51 of the figure cover C'.

While I have herein shown and described the preferred form of my invention I wish it to be understood that I am aware of the fact that the construction, combination and arrangement of parts may be changed by those skilled in the art without departing from the spirit of the invention as indicated by the appended claims.

What I claim is:

1. A signal unit comprising a supporting plate, a pair of cylinders mounted upon the forward face of said supporting plate, a piston for each cylinder, a pair of signalling arms, each arm having its one end pivotally connected to the supporting plate, a link connection between each arm and one of the pistons whereby upon the piston moving upwardly the arm will be swung to its signalling position, and a cover casing for the mechanism including the cylinders supported by said supporting plate, said cover casing being in the form of a figure, and having a transverse recess, and a signal member bearing the word "Stop" mounted upon the supporting plate and adapted to be brought into register with said recess in the cover upon both arms assuming their signalling position.

2. A signal unit comprising a supporting plate having its upper end formed with a circular portion supporting an electric light, a pair of signal arms each having its one end pivotally connected to the upper end of said supporting plate, means carried by said supporting plate whereby the signal arms may be swung outwardly and upwardly to a signalling position, a cover for said supporting plate having a recess transversely thereof, a stop sign arranged upon said cover for vertical movement, and means whereby said stop sign will be brought into register with the transverse opening upon the arms both assuming their signalling position.

3. A signal unit comprising a supporting plate, a pair of cylinders and pistons therefor mounted upon the forward face of said supporting plate, a pair of signal arms, each arm having its one end pivotally connected to the supporting plate and adapted to be swung upwardly, connecting means between said pistons and said signal arms whereby upon the upward movement of the pistons the arms will be brought to their signaling position, a cover for said supporting plate having a transverse opening, a plate vertically slidable beneath said cover having the word "Stop" written thereon and adapted to be brought into said opening of the cover, and means whereby upon both signal arms being raised to their signalling position the stop plate will be brought into register with said opening.

4. A signal unit comprising a supporting plate, a pair of cylinders arranged vertically thereon, a piston for each cylinder, a pair of signal arms each having its one end pivoted to the upper end of each supporting plate, a link connection between each piston and one of the signal arms whereby upon the upward movement of the piston the signal arm will be raised to its signalling position, a pivoted cross arm mounted for vertical sliding movement upon the supporting plate and carrying a plate bearing letters to form the word "Stop," said pivoted cross arm being adapted to move on its pivot and remain stationary upon either one of the pistons moving upwardly and also adapted to move upwardly when both pistons move upwardly simultaneously, and a cover for said supporting plate having a transverse recess with which the plate bearing the word "Stop" is adapted to be brought into register when moved upwardly by said pivoted cross arm.

5. A signalling apparatus for motor vehicles comprising a pair of signal units, one at the forward end of the motor vehicle and one at the rearward end thereof, and each unit having a pair of signalling arms, means whereby said signal arm upon the left side of each unit may be brought to signalling position simultaneously and means whereby the signal arm upon the right side of each unit may be brought to signal position simultaneously, means whereby the arms of each unit may be raised to signalling position simultaneously, and means whereby the word "Stop" may be displayed upon each signalling unit simultaneously with the raising of both signalling arms thereof.

6. A signalling apparatus for motor vehicles comprising a pair of signal units, one at the forward end of the motor vehicle and one at the rearward end thereof, and each unit having a pair of signalling arms, means whereby said signal arm upon the left side of each unit may be brought to signalling position simultaneously and means whereby the signal arm upon the right side of each unit may be brought to signal position simultaneously, means whereby the arms of each unit may be raised to signalling position simultaneously, a plate bearing letters to form the word "Stop" carried by each signal unit, said plate being movable and adapted to be brought to a display position, and means whereby said stop plate of each unit may be brought to its display position simultaneously with both arms of the unit assuming their signalling position.

7. In a signalling apparatus, a valve comprising a casing having an inlet at one end and a pair of outlets in the side wall thereof, a valve member fitted within said casing and adapted to be rotated therein, said valve member having a central bore communicating with a port in the side thereof and adapted to be rotated to bring said bore into communication with either of the outlets of said casing, and means carried by the casing to limit the rotative movement of said valve.

8. In a signalling apparatus, a valve comprising a casing having an inlet at one end and a pair of outlets in the side wall thereof, a valve member fitted within said casing and adapted to be rotated therein, said valve member having a central bore communicating with a port in the side thereof and adapted to be rotated to bring said bore into communication with either of the outlets of said casing, and said valve member having a groove formed thereabout and with orifices adapted to establish communication between said groove and the bore of said valve member whereby upon the valve member being raised a predetermined degree both outlets of the casing may be brought into communication with the inlet thereof.

9. In a signalling apparatus, a valve comprising a casing having an inlet at one end and a pair of outlets in the side wall thereof, a valve member fitted within said casing and adapted to be rotated therein, said valve member having a central bore communicating with a port in the side thereof and adapted to be rotated to bring said bore into communication with either of the outlets of said casing, and said valve member having a groove formed thereabout and with orifices adapted to establish communication between said groove and the bore of said valve member whereby upon the valve member being raised a predetermined degree both outlets of the casing may be brought into communication with the inlet thereof, and stop means carried by said casing to limit the upward movement of said valve member.

ALEXANDER J. PERRON.